United States Patent
Stewart

(10) Patent No.: US 10,178,681 B2
(45) Date of Patent: Jan. 8, 2019

(54) SYSTEMATIC APPROACH TO POWER THROTTLING FOR EQUIPMENT PROTECTION IN DATA CENTERS OR OTHER LOCATIONS

(71) Applicant: Honeywell International Inc., Morris Plains, NJ (US)

(72) Inventor: Gregory E. Stewart, North Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 260 days.

(21) Appl. No.: 14/864,536

(22) Filed: Sep. 24, 2015

(65) Prior Publication Data

US 2016/0316438 A1 Oct. 27, 2016

Related U.S. Application Data

(60) Provisional application No. 62/151,532, filed on Apr. 23, 2015.

(51) Int. Cl.
*H04W 52/26* (2009.01)
*H04W 72/10* (2009.01)
(Continued)

(52) U.S. Cl.
CPC .............. *H04W 72/10* (2013.01); *G06F 1/26* (2013.01); *G06F 1/329* (2013.01); *G06F 9/5094* (2013.01); *Y02D 10/24* (2018.01)

(58) Field of Classification Search
None
See application file for complete search history.

(56) References Cited

U.S. PATENT DOCUMENTS 8,112,642 B2   2/2012  Bose et al.
8,621,248 B1  12/2013  Weber et al.
(Continued)

FOREIGN PATENT DOCUMENTS

WO    WO 2009/058880 A2    5/2009

OTHER PUBLICATIONS

Notification of Transmittal of the International Search Report and the Written Opinion of the International Searching Authority, or the Declaration dated Jul. 20, 2016 in connection with International Patent Application No. PCT/US2016/027201.

(Continued)

*Primary Examiner* — Kouroush Mohebbi

(57) ABSTRACT

A method includes receiving information identifying one or more power constraint violations in a hierarchy of computing devices. The hierarchy has multiple levels, and the computing devices are grouped into different collections in one or more levels of the hierarchy. The one or more power constraint violations are associated with at least one of the levels. The method also includes classifying each power constraint violation by identifying, for each power constraint violation, one or more of the computing devices that potentially contribute to that power constraint violation. In addition, the method includes resolving the one or more power constraint violations by throttling power consumption of at least one of the one or more computing devices identified as potentially contributing to the one or more power constraint violations.

20 Claims, 5 Drawing Sheets

(51) Int. Cl.
    *G06F 1/26*         (2006.01)
    *G06F 1/32*         (2006.01)
    *G06F 9/50*         (2006.01)

(56) References Cited

U.S. PATENT DOCUMENTS

| | | |
|---|---|---|
| 8,645,733 B2 | 2/2014 | Kansal et al. |
| 2004/0236472 A1 | 11/2004 | Junk et al. |
| 2005/0102544 A1 | 5/2005 | Brewer et al. |
| 2014/0047252 A1 | 2/2014 | Ansari et al. |
| 2016/0011914 A1* | 1/2016 | Bohn .................. G06F 9/5094 713/300 |

OTHER PUBLICATIONS

Qiang Wu, "Making Facebook's Software infrastructure more energy efficient with Autoscate", Aug. 8, 2014, 9 pages.

"Raritan Introduces Intelligent Inline-Meter Rack PDUs to Gather Power Information on Data Center IT Equipment Connected to 'Not-So-Smart' PDUs", Raritan, Oct. 26, 2009, 4 pages.

\* cited by examiner

SYSTEMATIC APPROACH TO POWER THROTTLING FOR EQUIPMENT PROTECTION IN DATA CENTERS OR OTHER LOCATIONS

CROSS-REFERENCE TO RELATED APPLICATION AND PRIORITY CLAIM

This application claims priority under 35 U.S.C. § 119(e) to U.S. Provisional Patent Application No. 62/151,532 filed on Apr. 23, 2015. This provisional application is hereby incorporated by reference in its entirety.

TECHNICAL FIELD

This disclosure relates generally to power management techniques. More specifically, this disclosure relates to a systematic approach to power throttling for equipment protection in data centers or other locations.

BACKGROUND

Modern data centers can have a huge number of individual computing servers, with some larger data centers having tens of thousands of computing servers or even more. The equipment in these data centers is often logically arranged and managed hierarchically. For example, there could be multiple sites, a single site could include multiple rooms, each room could include multiple rows, and each row could include multiple computing servers. Power constraints may exist at each level of the hierarchy, such as when each row can draw up to a first threshold amount of power, each room can draw up to a second threshold amount of power, and the site can draw up to a third threshold amount of power.

At times of high customer demand, a data center may wish to maximize computing usage and thus power usage while still avoiding constraint violations in order to protect its equipment. However, modern data centers and servers are becoming more and more complex. As a result, it is becoming more and more difficult to effectively manage the power consumption of a modern data center to ensure that power constraints are followed. The failure to properly follow a power constraint could result in damage to servers or other equipment in the data center.

SUMMARY

This disclosure relates to a systematic approach to power throttling for equipment protection in data centers or other locations.

In a first embodiment, a method includes receiving information identifying one or more power constraint violations in a hierarchy of computing devices. The hierarchy has multiple levels, and the computing devices are grouped into different collections in one or more levels of the hierarchy. The one or more power constraint violations are associated with at least one of the levels. The method also includes classifying each power constraint violation by identifying, for each power constraint violation, one or more of the computing devices that potentially contribute to that power constraint violation. In addition, the method includes resolving the one or more power constraint violations by throttling power consumption of at least one of the one or more computing devices identified as potentially contributing to the one or more power constraint violations.

In a second embodiment, an apparatus includes at least one processing device configured to receive information identifying one or more power constraint violations in a hierarchy of computing devices. The hierarchy has multiple levels, and the computing devices are grouped into different collections in one or more levels of the hierarchy. The one or more power constraint violations are associated with at least one of the levels. The at least one processing device is also configured to classify each power constraint violation by identifying, for each power constraint violation, one or more of the computing devices that potentially contribute to that power constraint violation. The at least one processing device is further configured to resolve the one or more power constraint violations by throttling power consumption of at least one of the one or more computing devices identified as potentially contributing to the one or more power constraint violations.

In a third embodiment, a non-transitory computer readable medium contains computer readable program code that, when executed, causes at least one processing device to receive information identifying one or more power constraint violations in a hierarchy of computing devices. The hierarchy has multiple levels, and the computing devices are grouped into different collections in one or more levels of the hierarchy. The one or more power constraint violations are associated with at least one of the levels. The medium also contains computer readable program code that, when executed, causes the at least one processing device to classify each power constraint violation by identifying, for each power constraint violation, one or more of the computing devices that potentially contribute to that power constraint violation. The medium further contains computer readable program code that, when executed, causes the at least one processing device to resolve the one or more power constraint violations by throttling power consumption of at least one of the one or more computing devices identified as potentially contributing to the one or more power constraint violations.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
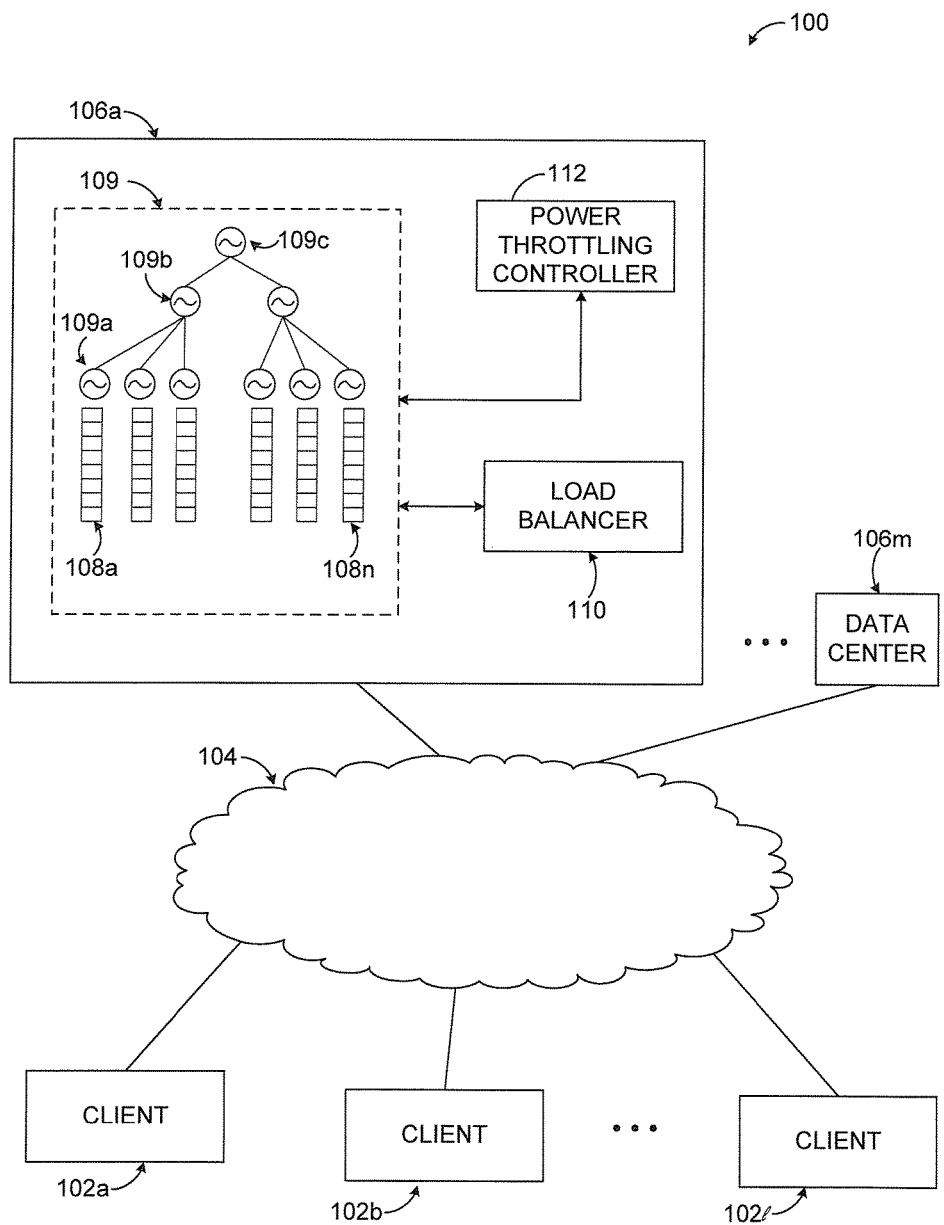
FIG. 1 illustrates an example computing system including one or more data centers according to this disclosure.

FIG. 1 illustrates an example computing system 100 including one or more data centers according to this disclosure. As shown in FIG. 1, the system 100 includes multiple clients 102a-102l. The clients 102a-102l represent computing devices or systems used by customers wishing to obtain computing services from one or more data centers. Each of the clients 102a-102l represents any suitable computing device(s) or system(s) at one or more locations.

The clients 102a-102f are configured to communicate over at least one network 104. The network 104 facilitates communication between various components in the system 100. For example, the network 104 may transport Internet Protocol (IP) packets, frame relay frames, Asynchronous Transfer Mode (ATM) cells, or other information between network addresses. The network 104 may include one or more local area networks (LANs), metropolitan area networks (MANs), wide area networks (WANs), all or a portion of a global network such as the Internet, or any other communication system or systems at one or more locations.

One or more data centers 106a-106m are configured to provide computing services to the clients 102a-102l. Each data center 106a-106m could be configured to provide any suitable computing service(s) to its customers. For example, each data center 106a-106m could be used to provide "cloud computing" services or other remote computing services to customers.

In the example shown in FIG. 1, each data center 106a-106m can include multiple servers 108a-108n and one or more optional load balancers 110. The servers 108a-108n generally denote computing devices that perform specified functions in a data center 106a-106m. Often times, different servers 108a-108n are used to perform different types of functions in a data center 106a-106m. For example, some servers 108a-108n could denote web servers or other servers used to support interactions with the clients 102a-102f via the network 104. Other servers 108a-108n could denote application servers or other servers used to execute applications that provide services to the clients 102a-102l. Still other servers 108a-108n could denote database servers or other servers that manage data used in the data center 106a-106m. Any other or additional types of servers could be used in the data center 106a-106m. Each server 108a-108n includes any suitable structure for performing one or more processing functions.

Each load balancer 110 helps to distribute computing workloads amongst the various servers 108a-108n in a data center 106a-106m. For example, when a data center 106a-106m includes multiple servers 108a-108n that receive and process requests from the clients 102a-102l, the load balancer 110 can help to distribute those requests in a suitable manner (such as a round robin or modified round robin approach). Each load balancer 110 includes any suitable structure for distributing workloads across multiple computing devices.

In this example, the servers 108a-108n are grouped in a hierarchical arrangement 109, where different levels correspond to larger or smaller groupings of the servers 108a-108n. For example, nodes 109a in the hierarchical arrangement 109 could denote rows of servers. Nodes 109b in the hierarchical arrangement 109 could denote rooms of servers, where each room includes one or more rows. The node 109c in the hierarchical arrangement 109 could denote a site that includes multiple rooms. Note, however, that the physical grouping of servers into a hierarchical arrangement could vary in any suitable manner. Moreover, the servers can be logically grouped into a hierarchical arrangement without regard to their actual physical arrangement.

Note that the data centers 106a-106m need not have the same configuration. Different data centers 106a-106m could have different arrangements of servers, load balancers, and other components according to particular needs. Also, a single entity could be associated with a single data center 106a-106m or multiple data centers 106a-106m, and the system 100 could include data centers associated with any number of entities.

As shown in FIG. 1, at least one of the data centers 106a-106m includes a power throttling controller 112. The power throttling controller 112 is communicatively coupled to the various servers 108a-108n in at least one of the data centers 106a-106m. The power throttling controller 112 operates to adjust the amount of power consumed by various servers 108a-108n in at least one of the data centers 106a-106m in order to resolve power constraint violations. For example, in response to power constraint violations in at least one data center 106a-106m, the power throttling controller 112 throttles power consumption by one or more servers of the data center(s) 106a-106m to resolve the constraint violations.

As noted above, the servers 108a-108n in a data center 106a-106m could be logically arranged and managed hierarchically. For example, a single data center (site) could include one or more rooms, each room could include one or more rows, and each row could include one or more servers. The servers themselves can be said to represent "bottom level" or "leaf node" devices since they reside at the bottom of the hierarchy and may form leaves of a tree structure representing the hierarchy. Power constraints may exist at each level of the hierarchy, such as when a row can draw up to a first threshold amount of power, a room can draw up to a second threshold amount of power, and a site can draw up to a third threshold amount of power. If a power constraint is violated (either at the device, row, room, or site level), the power throttling controller 112 can throttle the power consumed by one or more servers to help alleviate the constraint violation.

As described below, the power throttling controller 112 uses a process to systematically address over-powered or at-risk computing devices while at the same time respecting priorities of the computing devices. A two-step process is used, which includes:

Step 1: Classify the devices and power issues, starting at the top of the hierarchy of devices and working downward in the hierarchy; and Step 2: Solve the power issues by throttling, starting at the bottom layer in the hierarchy of devices and working up the hierarchy, while respecting the priorities of the devices.

In this way, the power throttling controller 112 quickly makes adjustments to device operations in order to resolve power constraint violations, which can help to reduce or avoid damage to the computing devices or associated equipment. Moreover, this can be done in a manner that at least considers, and ideally preserves, the relative priorities of the computing devices when making the power adjustments.

In some embodiments, the power throttling controller 112 uses at least one model of a data center or other location(s). The model could identify the various computing devices and the hierarchical arrangement of those computing devices. The model could also identify how changes to the power consumption in each device affect higher levels of the hierarchical arrangement. For instance, the model could identify how changes in the power consumption of each computing device also affect the power consumption of a row including that computing device. The model could also identify how changes in the power consumption of each row of computing devices also affect the power consumption of a room including that row, as well as how changes in the power consumption of each room affect the power consumption of a site including that room.

Note that in FIG. 1, the power throttling controller 112 is shown as residing in the data center 106a. However, the same power throttling controller 112 could be used to control the power consumption of the servers in one or more other data centers, or different data centers could include their own power throttling controllers. Moreover, the power throttling controller 112 need not reside in any of the data centers and could reside in a location where the data centers can be accessed. The power throttling controller 112 includes any suitable structure supporting power throttling, such as a server or other computing device.

Although FIG. 1 illustrates one example of a computing system 100 including one or more data centers, various changes may be made to FIG. 1. For example, the system 100 could include any number of clients, networks, data centers, servers, load balancers, and power throttling controllers. Also, the functional division shown in FIG. 1 is for illustration only. Various components in FIG. 1 could be omitted, combined, or further subdivided and additional components could be added according to particular needs. As a particular example, the power throttling controller 112 could be integrated into another component or components of a data center. Further, computing systems come in a wide variety of configurations, and FIG. 1 does not limit this disclosure to any particular configuration of computing system. In addition, power throttling of devices in a hierarchical arrangement could be performed with respect to other devices and need not be limited to use with servers in a data center.

Figure 2:
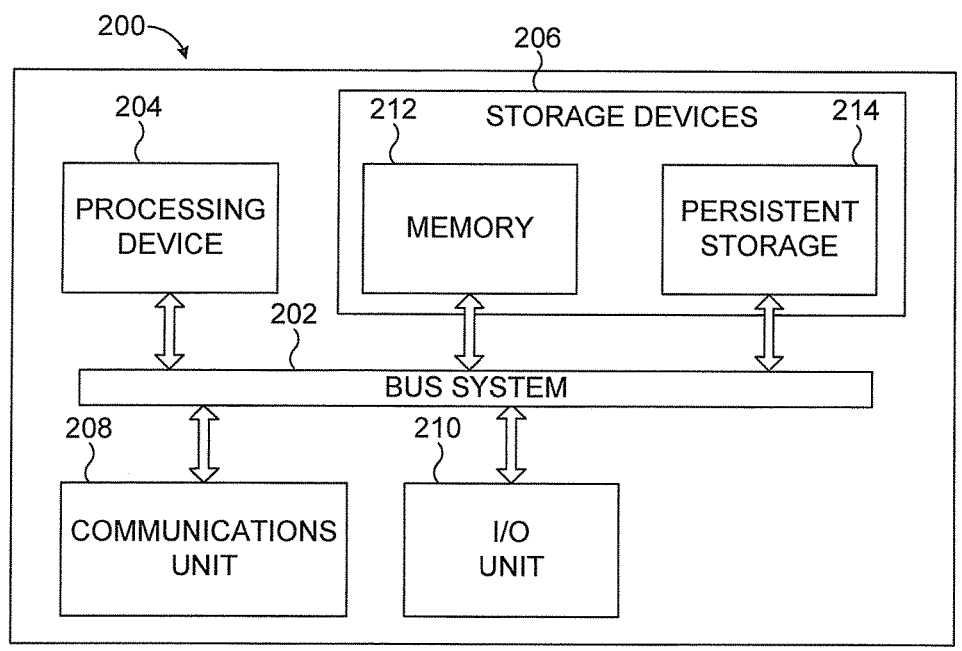
FIG. 2 illustrates an example device supporting power throttling for equipment protection according to this disclosure.

FIG. 2 illustrates an example device 200 supporting power throttling for equipment protection according to this disclosure. The device 200 could, for example, represent the power throttling controller 112 in the system 100 of FIG. 1. However, the power throttling controller 112 could be implemented using any other suitable device or system, and the power throttling controller 112 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

In some embodiments, the device 200 could execute instructions used to perform any of the functions associated with the power throttling controller 112. For example, the device 200 could execute instructions that detect power constraint violations, such as by receiving power consumption measurements and comparing the measurements to thresholds or by receiving indications of power constraint violations detected by other components of a system. The device 200 could also execute instructions that use a two-step process of top-down classification and bottom-up throttling to resolve the power constraint violations. The device 200 could further execute instructions that allow the device 200 to transmit instructions that control or adjust the power consumption of the servers 108a-108n or other devices in one or more data centers 106a-106m or other location(s) based on the two-step process.

Although FIG. 2 illustrates one example of a device 200 supporting power throttling for equipment protection, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
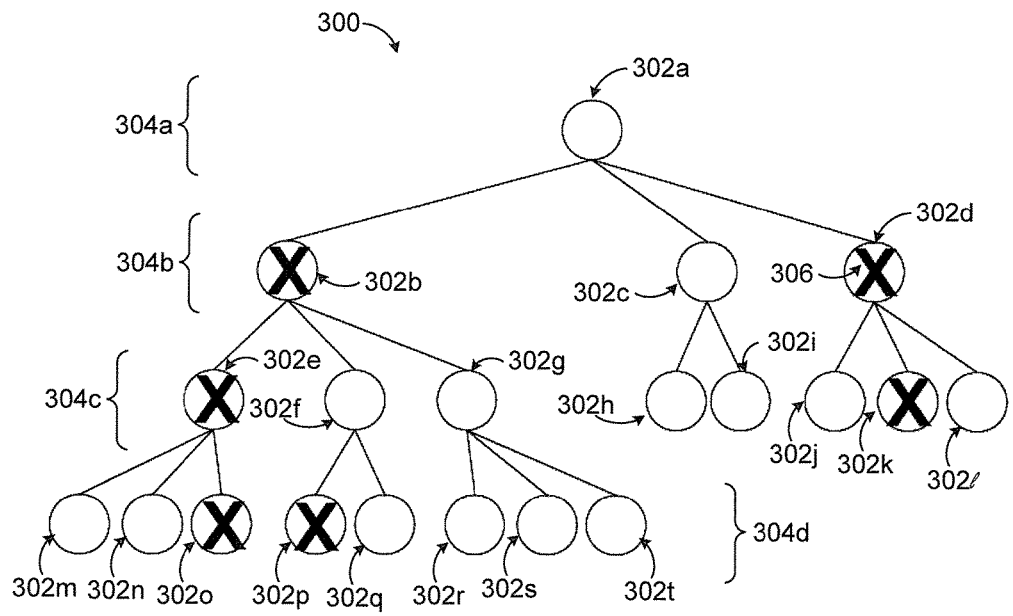
FIG. 3 illustrates an example hierarchy of computing equipment experiencing various power constraint violations according to this disclosure.

FIG. 3 illustrates an example hierarchy 300 of computing equipment experiencing various power constraint violations according to this disclosure. As shown in FIG. 3, the hierarchy 300 includes various nodes 302a-302t positioned at multiple levels 304a-304d of the hierarchy 300. Each node 302a-302t generally represents a single computing device or a collection of computing devices, such as individual servers 108a-108n or collections of servers 108a-108n in one or more data centers 106a-106m. In this example, the bottom level or leaf node devices in the hierarchy 300 are represented by the nodes 302h-302t, meaning these nodes 302h-302t do not have any child nodes in the tree structure. These nodes 302h-302t could represent individual computing devices in one or more locations, such as individual servers.

Individual devices can be grouped in any suitable manner, such as into rows or other collections of devices. For example, the nodes 302m-302o can be grouped into a row represented by the node 302e, the nodes 302p-302q can be grouped into a row represented by the node 302f, and the nodes 302r-302t can be grouped into a row represented by the node 302g. Similarly, the nodes 302h-302i can be grouped into a row represented by the node 302c, and the nodes 302j-302l can be grouped into a row represented by node 302d. Note, however, that each row could include any number of computing devices.

Individual rows can also be grouped in any suitable manner, such as into rooms or other collections of devices. For example, the nodes 302e-302g can be grouped into a room represented by the node 302b. Also, rows, rooms, or other collections of devices can be grouped together in any suitable manner, such as to form a site. For instance, the nodes 302b-302d can be grouped into a site represented by the node 302a.

Various "X" indicators 306 are used in FIG. 3 to identify nodes experiencing power constraint violations. In general, power constraint violations can occur at any level 304a-304d of the hierarchy 300, and the response to a power constraint violation can vary based on the level at which the power constraint violation occurs. For example, power constraint violations occurring with bottom level or leaf node devices (such as those represented by nodes 302k, 302o, and 302p) could be resolved by throttling those individual bottom level or leaf node devices.

Power constraint violations occurring in a row of devices (such as those represented by nodes 302d and 302e) may or may not be associated with lower-level power constraint violations occurring in individual devices forming the row. If there are one or more lower-level power constraint violations in one or more underlying individual devices, those individual devices could be throttled in order to resolve the lower-level power constraint violations, which ideally would also resolve the power constraint violation in a row. If that does not resolve the power constraint violation in the row or if there are no lower-level power constraint violations occurring in the underlying devices, one or more devices that are not experiencing a power constraint violation in a row could be throttled in order to resolve the power constraint violation in that row.

Power constraint violations occurring in a room of devices (such as the one represented by node 302b) may or may not be associated with lower-level power constraint violations occurring in individual devices or rows of devices forming the room. If there are one or more lower-level power constraint violations in one or more underlying individual devices or rows, the individual devices or rows could be throttled in order to resolve the lower-level power constraint violations, which ideally would also resolve the power constraint violation in a room. If that does not resolve the power constraint violation in the room or if there are no lower-level power constraint violations occurring in the underlying devices or rows, one or more devices or rows that are not experiencing a power constraint violation in a room could be throttled in order to resolve the power constraint violation in that room.

Power constraint violations occurring in a site (such as the one represented by node 302a) may or may not be associated with lower-level power constraint violations occurring in individual devices, rows, or rooms forming the site. If there are one or more lower-level power constraint violations in one or more underlying individual devices, rows, or rooms, the individual devices, rows, or rooms could be throttled in order to resolve the lower-level power constraint violations, which ideally would also resolve the power constraint violation in a site. If that does not resolve the power constraint violation in the site or if there are no lower-level power constraint violations occurring in the underlying devices, rows, or rooms, one or more devices, rows, or rooms that are not experiencing a power constraint violation in a site could be throttled in order to resolve the power constraint violation in that site.

Except when an individual device is experiencing a power constraint violation (and therefore that one single device is throttled), there may be various ways to throttle a combination of devices in order to resolve a power constraint violation. For example, different combinations of individual devices could be throttled to resolve a power constraint violation in a row, different combinations of devices in one or more rows could be throttled to resolve a power constraint violation in a room, and different combinations of devices in one or more rooms could be throttled to resolve a power constraint violation in a site. In some embodiments, devices can be selected for throttling while taking into account the relative priorities of those devices. The relative priorities could denote priorities placed on the performance of the various devices. For instance, higher priority values could be used to identify devices where more power is needed to ensure adequate performance of the devices, while lower priority values could be used to identify devices where power can be reduced while still obtaining adequate performance of the devices. These priorities can be considered when a power throttling controller 112 needs to throttle one or more computing devices. For instance, the power throttling controller 112 could first attempt to reduce the power consumption of lower priority devices in order to resolve a power constraint violation before attempting to reduce the power consumption of higher priority devices.

Although FIG. 3 illustrates one example of a hierarchy 300 of computing equipment experiencing various power constraint violations, various changes may be made to FIG. 3. For example, the hierarchy 300 in FIG. 3 is related to one specific deployment of computing devices, and other deployments can be associated with different hierarchies. Also, while shown as a tree structure, other hierarchies may be used. As a particular example, there may be situations where some devices or collections of devices can receive power from multiple sources. In that case, the resulting hierarchy may not be a pure tree structure. If a device receives power from multiple sources and one source violates a power constraint, one solution could be to shift some of the load to another source that is not constrained. In addition, labels such as "rows," "rooms," and "sites" are used here to denote different collections of devices, but these labels are examples only. Any other labels can be used to denote any other suitable physical or logical combinations of devices in a hierarchy.

Figure 4:
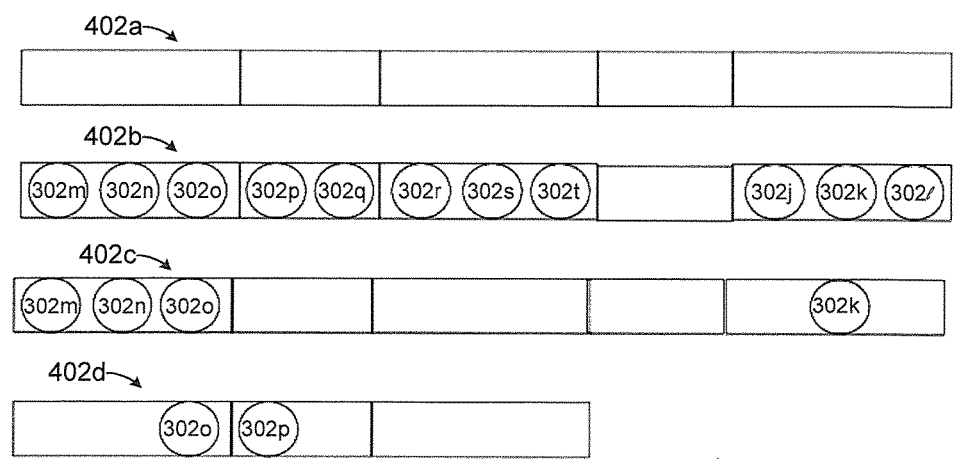
FIG. 4 illustrates an example data structure identifying power constraint violations at different hierarchical levels of computing equipment according to this disclosure.

FIG. 4 illustrates an example data structure 400 identifying power constraint violations at different hierarchical levels of computing equipment according to this disclosure. For ease of explanation, the data structure 400 shown in FIG. 4 is described with respect to the hierarchy 300 of FIG. 3, which can be used to represent the servers in at least one data center of FIG. 1. However, the data structure 400 could be used to represent any suitable computing devices in any suitable locations.

As shown in FIG. 4, the data structure 400 includes multiple sub-structures 402a-402d, each of which is associated with one of the levels 304a-304d in the hierarchy 300. While four structures 402a-402d are shown here, other numbers of structures could be used depending on the number of levels in the equipment hierarchy.

Each sub-structure 402a-402d identifies all of the individual computing devices that potentially contribute to any power constraint violations at the associated hierarchical level. For example, in FIG. 3, the level 304a in the hierarchy 300 has no power constraint violations. As a result, the corresponding sub-structure 402a in FIG. 4 identifies no individual computing devices.

In FIG. 3, the level 304b in the hierarchy 300 has two power constraint violations, one involving the node 302b and one involving the node 302d. The corresponding sub-structure 402b in FIG. 4 therefore identifies all of the computing devices that potentially contribute to the power constraint violation for the node 302b and all of the computing devices that potentially contribute to the power constraint violation for the node 302d. Since the node 302b includes all of the individual computing devices represented by the nodes 302m-302t, the sub-structure 402b identifies the nodes 302m-302t as possibly causing the power constraint violation for the node 302b. Similarly, since the node 302d includes all of the individual computing devices represented by the nodes 302j-302f, the sub-structure 402b identifies the nodes 302j-302f as possibly causing the power constraint violation for the node 302d.

In FIG. 3, the level 304c in the hierarchy 300 has two power constraint violations, one involving the node 302e and one involving the node 302k. Again, the corresponding sub-structure 402c in FIG. 4 identifies all of the computing devices that potentially contribute to the power constraint violation for the node 302e and all of the computing devices that potentially contribute to the power constraint violation for the node 302k. Since the node 302e includes the individual computing devices represented by the nodes 302m-302o, the sub-structure 402c identifies the nodes 302m-302o as possibly causing the power constraint violation for the node 302e. Since the node 302k is a bottom level or leaf node, the sub-structure 402c identifies the node 302k as the only possible cause of the power constraint violation for the node 302k.

In FIG. 3, the level 304d in the hierarchy 300 has two power constraint violations, one involving the node 302o and one involving the node 302p. Again, the corresponding sub-structure 402d in FIG. 4 identifies all of the computing devices that potentially contribute to the power constraint violation for the node 302o and all of the computing devices that could potentially to the power constraint violation for the node 302p. Since both nodes 302o-302p are bottom level or leaf node devices, the sub-structure 402d identifies each node 302o-302p as the only possible cause of the power constraint violation for that node 302o-302p.

This represents a top-down classification of power constraint violations in a data center or other location. Using this process, the power throttling controller 112 can identify locations of power constraint violations within a hierarchy of computing devices, and potential causes of those power constraint violations can be determined. Once this information is identified, bottom-up throttling can be performed to resolve the identified power constraint violations. That is, the power throttling controller 112 can begin throttling computing devices starting at the lowest level of the hierarchy 300 and moving upward. Ideally, resolving power constraint violations at lower levels will also resolve power constraint violations occurring at higher levels, such as when resolving a power constraint violation of an individual computing device also resolves a power constraint violation for a row in which that individual computing device is located. If not, additional devices can be throttled as necessary to resolve the power constraint violations at higher levels (while taking into account relative device priorities).

Note that the data structure 400 described here could be implemented in any suitable manner. For example, in the hierarchy 300 of FIG. 3, there are four levels of devices and thirteen devices considered as bottom level or leaf node devices. The data structure 400 could therefore be implemented using four sets of thirteen entries, where each entry can be assigned a specific value to denote that a node is a potential cause of a power constraint violation. The data structure 400 could also be implemented using four linked lists, where each linked list identifies nodes that are a potential cause of a power constraint violation at the hierarchical level associated with the linked list. In general, there are a wide variety of data structures that could be used to identify computing devices that potentially contribute to power constraint violations at various levels of a hierarchy.

Although FIG. 4 illustrates one example of a data structure 400 identifying power constraint violations at different hierarchical levels of computing equipment, various changes may be made to FIG. 4. For example, the data structure 400 in FIG. 4 is related to one specific deployment of computing devices, and other deployments can be associated with different data structures.

Figure 5:
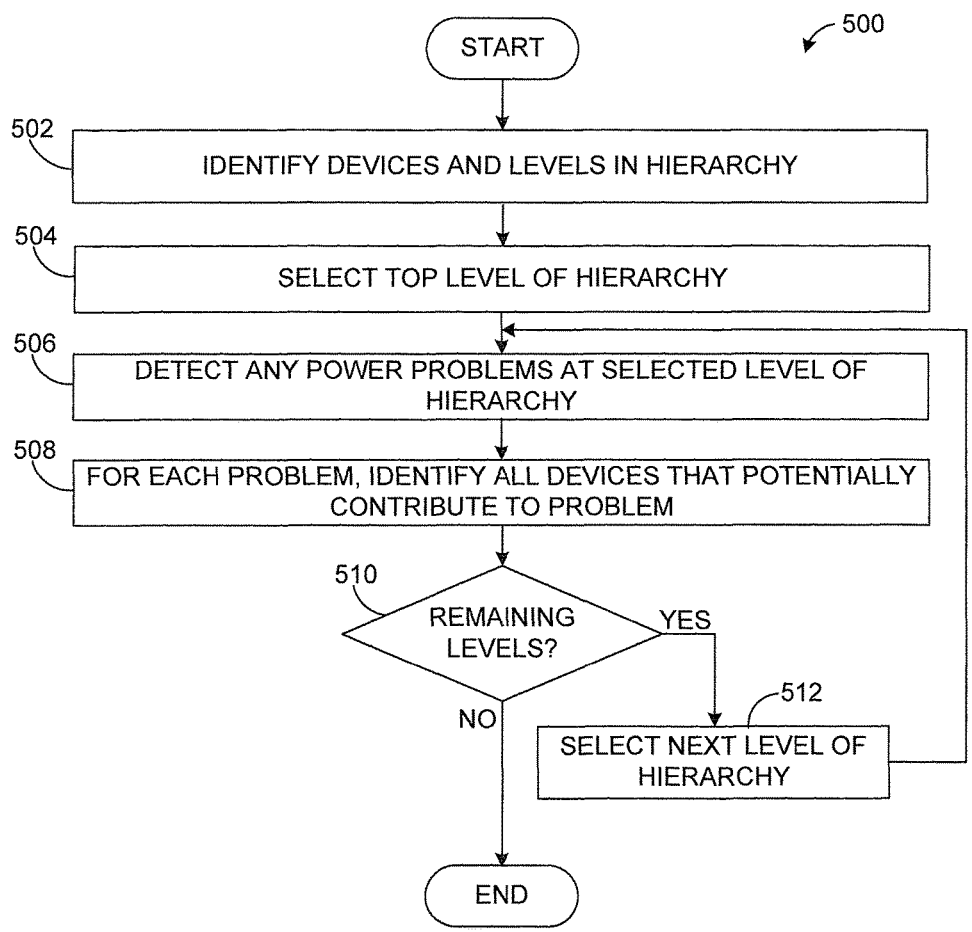
FIGS. 5 and 6 illustrate example methods for providing a systematic approach to power throttling for equipment protection in data centers or other locations according to this disclosure.
Figure 6:
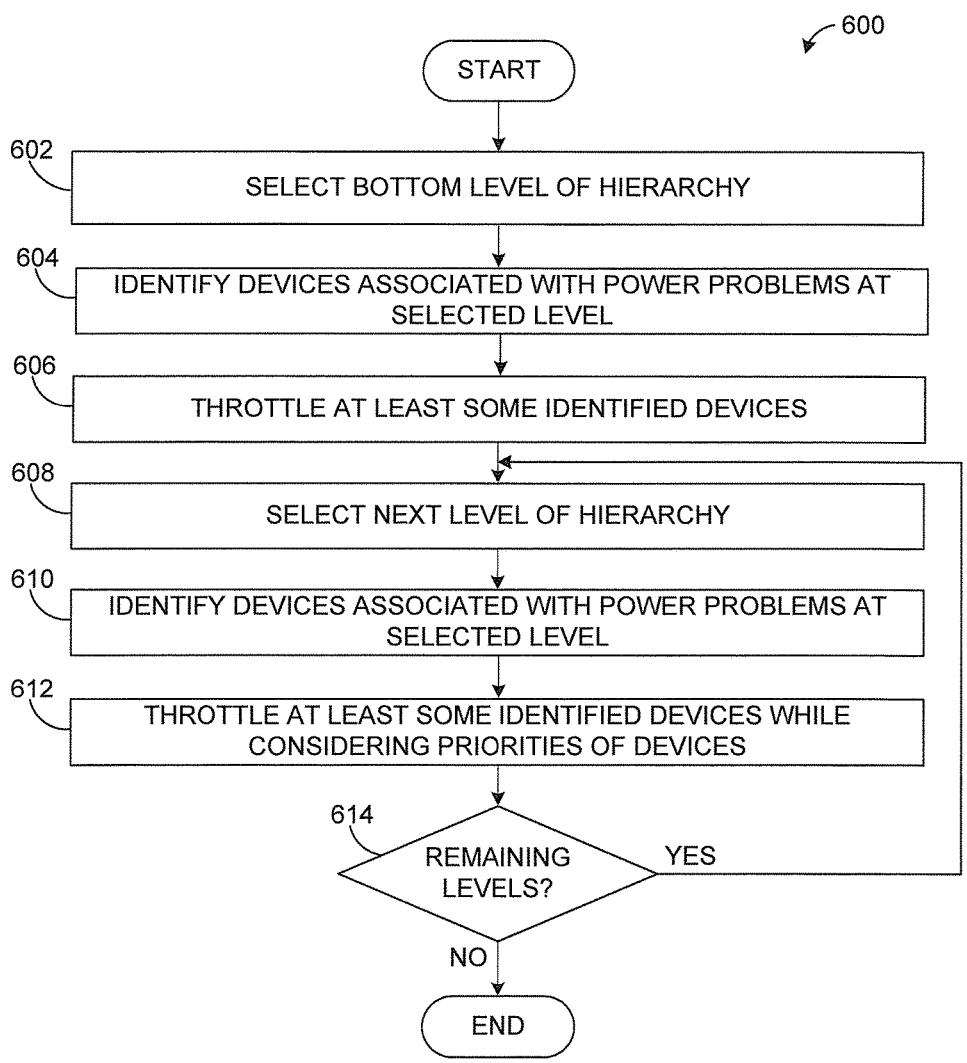

FIGS. 5 and 6 illustrate example methods 500 and 600 for providing a systematic approach to power throttling for equipment protection in data centers or other locations according to this disclosure. More specifically, the method 500 of FIG. 5 denotes a top-down approach for identifying and classifying power issues, while the method 600 of FIG. 6 denotes a bottom-up approach for resolving the identified power issues. For ease of explanation, the methods 500 and 600 shown in FIGS. 5 and 6 are described as being performed by the power throttling controller 112 in the system 100 of FIG. 1. However, the methods 500 and 600 could be used by any suitable devices or systems in any suitable locations.

As shown in FIG. 5, devices and levels in a hierarchy of computing devices are identified at step 502. This could include, for example, the power throttling controller 112 receiving information identifying the various servers 108a-108n in one or more data centers 106a-106m and the arrangement of those servers 108a-108n. This information could be obtained in any suitable manner. As a particular example, the information could be obtained from one or more models identifying computing devices and an arrangement of the computing devices.

A top level of the hierarchy is selected at step 504. This could include, for example, the power throttling controller 112 identifying the top level of the hierarchy, either automatically or based on user input. Any power problems at the selected level are identified at step 506. This could include, for example, the power throttling controller 112 identifying any nodes in the selected level of the hierarchy that have an associated power constraint violation. As noted above, nodes with power constraint violations could be identified in any suitable manner, such as the power throttling controller 112 receiving power consumption measurements and comparing the measurements to thresholds or by receiving indications of power constraint violations detected by other components.

For each identified power problem in the selected level, all devices that potentially contribute to the power problem are identified at step 508. This could include, for example, the power throttling controller 112 selecting one of the identified power problems and identifying the specific node associated with that power problem. This could also include the power throttling controller 112 identifying all of the individual computing devices that form the specific node. The individual computing devices that form the specific node include all of the devices (represented by the bottom level or leaf nodes) forming the specific node. The identities of the devices that potentially contribute to the power problems can be stored in the data structure 400 or in any other suitable manner.

A determination is made whether there are remaining levels in the hierarchy to be analyzed at step 510. If so, the next level in the hierarchy is selected at step 512. This could include, for example, the power throttling controller 112 identifying the next level of the hierarchy that is one level down from the current level, either automatically or based on user input. The process then returns to step 506 so that any power problems and the associated devices can be determined for the next hierarchical level of devices. Once the last level of the hierarchy is analyzed, the method 500 can end. At the end of this process, the power throttling controller 112 has identified the various power problems at different levels of the hierarchy and has identified potential devices that could be causing each of the identified power problems.

As shown in FIG. 6, a bottom level of the hierarchy is selected at step 602. This could include, for example, the power throttling controller 112 identifying the bottom level of the hierarchy, either automatically or based on user input. Devices associated with any power problems in the selected level are identified at step 604. This could include, for example, the power throttling controller 112 using the sub-structure 402d for the selected level in the data structure 400 to identify the devices potentially contributing to power constraint violations occurring in the selected level. The sub-structure for the selected level can identify any devices associated with power constraint violations.

At least some of the identified devices are throttled at step 606. This could include, for example, the power throttling controller 112 reducing the power consumption of one or more of the devices identified for the selected level. The power consumption of a device could be reduced in any suitable manner. For instance, some servers can operate in one of multiple states, and different states can be associated with different power consumptions. In some embodiments, one or more models could be used to identify how state changes in a computing device affect the power consumption of that computing device. Also, the model(s) could be used to predict how state changes in the identified devices might affect power consumption for higher layers of the hierarchy, ideally so that changes to the identified devices' power consumptions can be selected to help resolve power constraint violations at the selected level while also reducing or eliminating power constraint violations for higher levels. In addition, the power throttling controller 112 could throttle one or more identified devices for the selected level in any suitable manner, such as by generating one or more control signals for changing the operating state of the one or more identified devices.

The next level of the hierarchy is selected at step 608. This could include, for example, the power throttling controller 112 identifying the next level of the hierarchy that is one level above the current level, either automatically or based on user input. Devices associated with any power problems in the selected level are identified at step 610. This could include, for example, the power throttling controller 112 using the sub-structure 402c for the selected level in the data structure 400 to identify the devices potentially contributing to power constraint violations occurring in the selected level.

At least some of the identified devices are throttled while considering the respective priorities of the devices at step 612. This could include, for example, the power throttling controller 112 reducing the power consumption of one or more of the devices for the selected level. This could also include the power throttling controller 112 reducing the power consumption of devices with lower priorities before reducing the power consumption of devices with higher priorities or the power throttling controller 112 reducing the power consumption of devices with lower priorities to a greater extent than power consumption of devices with higher priorities is reduced. As a particular example, assume a room with a power constraint violation includes three rows of servers, but no row or individual server has any power constraint violations. The power throttling controller 112 could initially attempt to resolve the room's power constraint violation by throttling servers having a lower priority. If this does not resolve the room's power constraint violation, the power throttling controller 112 could then throttle servers having an intermediate priority and, if necessary, a highest priority. In addition, the power throttling controller 112 could throttle one or more identified devices for the selected level in any suitable manner, such as by generating one or more control signals for changing the operating state of the one or more identified devices.

Again, in some embodiments, one or more models could be used to identify how state changes in a computing device affect the power consumption of that computing device and to predict how state changes in the identified devices might affect power consumption for any higher layers of the hierarchy. Ideally, this can be done so that changes to the identified devices' power consumptions can be selected to help resolve power constraint violations at the selected level while also reducing or eliminating power constraint violations for higher levels.

A determination is made whether there are remaining levels in the hierarchy to be processed at step 614. If so, the process returns to step 608 to select the next level in the hierarchy and determine whether any devices need to be throttled. Once the last level of the hierarchy is processed, the method 600 can end. At the end of this process, the power throttling controller 112 has ideally resolved all power constraint violations in a data center or other location(s).

In this way, the power throttling controller 112 provides a systematic approach for controlling the power consumption of devices in a hierarchy and for controlling the throttling of those devices to resolve power constraint violations. Moreover, this can be done while respecting the relative priorities of the computing devices, which helps to maintain more important functions at the expense of less important functions.

Although FIGS. 5 and 6 illustrate examples of methods 500 and 600 for providing a systematic approach to power throttling for equipment protection in data centers or other locations, various changes may be made to FIGS. 5 and 6. For example, while each figure shows a series of steps, various steps in each figure could overlap, occur in parallel, occur in a different order, or occur any number of times. Also, as described above, the power throttling controller 112 could use one or more models of a data center or other location(s). A power throttling solution could consider one or both of model uncertainty and desired response time in identifying solutions to power constraint violations. Model uncertainty refers to mismatch between modeled behavior of a system and actual behavior of the system. Desired response time refers to the speed at which a response to a power constraint violation is generated by the power throttling controller 112. If model uncertainty is very low (meaning it is known with high accuracy the contribution of each bottom level or leaf node device to the whole system's power consumption), a full-scale one-off optimization could be performed. If model uncertainty is high, a stepwise approach might be more appropriate, such as where each power consumption in each layer is solved and then sensor information is used prior to solving the next layer. If the desired response time is fast (even if model uncertainty is large), a conservative solution might employ a full-scale one-off optimization, followed by a gradual un-throttling of the devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving information identifying one or more power constraint violations in a hierarchy of computing devices, the hierarchy having multiple levels, the computing devices grouped into different collections in one or more levels of the hierarchy, the one or more power constraint violations associated with at least one of the levels, the one or more power constraint violations including drawing up an amount of power that exceeds a threshold amount of power that can be drawn up at the associated at least one of the levels;
classifying each power constraint violation by identifying, for each power constraint violation, one or more of the computing devices that potentially contribute to that power constraint violation; and
resolving the one or more power constraint violations by throttling power consumption of at least one of the one or more computing devices identified as potentially contributing to the one or more power constraint violations.

2. The method of claim 1, wherein:
resolving the one or more power constraint violations comprises determining how to resolve the one or more power constraint violations while respecting different priorities of the computing devices;
multiple computing devices in a given level of the hierarchy are identified as potentially contributing to a specified power constraint violation; and
determining how to resolve the specified power constraint violation while respecting the different priorities of the computing devices comprises at least one of:
reducing the power consumption of a lower-priority computing device before reducing the power consumption of a higher-priority computing device; and
reducing the power consumption of the lower-priority computing device more than the power consumption of the higher-priority computing device is reduced.

3. The method of claim 1, wherein:
classifying each power constraint violation comprises classifying each power constraint violation starting at a top level of the hierarchy and moving downward in the hierarchy; and
resolving the one or more power constraint violations comprises resolving the one or more power constraint violations starting at a bottom level of the hierarchy and moving upward in the hierarchy.

4. The method of claim 1, wherein:
the information identifies multiple power constraint violations associated with at least two of the levels of the hierarchy; and
resolving a lower-level power constraint violation at least partially resolves a higher-level power constraint violation.

5. The method of claim 4, wherein:
resolving the lower-level power constraint violation only partially resolves the higher-level power constraint violation; and
the higher-level power constraint violation is resolved by throttling power consumption of at least one lower-level computing device that did not experience a power constraint violation.

6. The method of claim 1, wherein:
a specified power constraint violation is associated with a specified collection that includes multiple computing devices; and
classifying each power constraint violation comprises identifying, for the specified power constraint violation, all of the multiple computing devices in the specified collection as potentially contributing to the specified power constraint violation regardless of whether each individual computing device in the specified collection has a power constraint violation.

7. The method of claim 1, wherein:
the computing devices comprise computing servers; and
the different collections include different physical or logical groupings of the computing servers, wherein higher levels of the hierarchy include larger groupings of the computing servers.

8. An apparatus comprising:
a memory configured to contain instructions; and
at least one processing device configured to execute the instructions contained in the memory, and to:
receive information identifying one or more power constraint violations in a hierarchy of computing devices, the hierarchy having multiple levels, the computing devices grouped into different collections in one or more levels of the hierarchy, the one or more power constraint violations associated with at least one of the levels, the one or more power constraint violations including drawing up an amount of power that exceeds a threshold amount of power that can be drawn up at the associated at least one of the levels;
classify each power constraint violation by identifying, for each power constraint violation, one or more of the computing devices that potentially contribute to that power constraint violation; and
resolve the one or more power constraint violations by throttling power consumption of at least one of the one or more computing devices identified as potentially contributing to the one or more power constraint violations.

9. The apparatus of claim 8, wherein:
the at least one processing device is configured to identify multiple computing devices as potentially contributing to a specified power constraint violation; and
the at least one processing device is configured to resolve the one or more power constraint violations while respecting different priorities of the computing devices by at least one of:
reducing the power consumption of a lower-priority computing device before reducing the power consumption of a higher-priority computing device; and
reducing the power consumption of the lower-priority computing device more than the power consumption of the higher-priority computing device is reduced.

10. The apparatus of claim 8, wherein:
the at least one processing device is configured to classify each power constraint violation starting at a top level of the hierarchy and moving downward in the hierarchy; and
the at least one processing device is configured to resolve the one or more power constraint violations starting at a bottom level of the hierarchy and moving upward in the hierarchy.

11. The apparatus of claim 8, wherein:
the information identifies multiple power constraint violations associated with at least two of the levels of the hierarchy; and
the at least one processing device is configured to resolve a lower-level power constraint violation in a manner that at least partially resolves a higher-level power constraint violation.

12. The apparatus of claim 11, wherein, in response to the lower-level power constraint violation only partially resolving the higher-level power constraint violation, the at least one processing device is configured to resolve the higher-level power constraint violation by throttling power consumption of at least one lower-level computing device that did not experience a power constraint violation.

13. The apparatus of claim 8, wherein:
a specified power constraint violation is associated with a specified collection that includes multiple computing devices; and
the at least one processing device is configured to classify each power constraint violation by identifying, for the specified power constraint violation, all of the multiple computing devices in the specified collection as potentially contributing to the specified power constraint violation regardless of whether each individual computing device in the specified collection has a power constraint violation.

14. The apparatus of claim 8, wherein:
the computing devices comprise computing servers; and
the different collections include different physical or logical groupings of the computing servers, wherein higher levels of the hierarchy include larger groupings of the computing servers.

15. A non-transitory computer readable medium containing computer readable program code that, when executed, causes at least one processing device to:
receive information identifying one or more power constraint violations in a hierarchy of computing devices, the hierarchy having multiple levels, the computing devices grouped into different collections in one or more levels of the hierarchy, the one or more power constraint violations associated with at least one of the levels, the one or more power constraint violations including drawing up an amount of power that exceeds a threshold amount of power that can be drawn up at the associated at least one of the levels;
classify each power constraint violation by identifying, for each power constraint violation, one or more of the computing devices that potentially contribute to that power constraint violation; and
resolve the one or more power constraint violations by throttling power consumption of at least one of the one or more computing devices identified as potentially contributing to the one or more power constraint violations.

16. The non-transitory computer readable medium of claim 15, wherein:
the computer readable program code that, when executed, causes the at least one processing device to classify each power constraint violation comprises computer readable program code that, when executed, causes the at least one processing device to identify multiple computing devices as potentially contributing to a specified power constraint violation; and
the computer readable program code that, when executed, causes the at least one processing device to determine how to resolve the one or more power constraint violations comprises computer readable program code that, when executed, causes the at least one processing device to respect different priorities of the computing devices by at least one of:
reducing the power consumption of a lower-priority computing device before reducing the power consumption of a higher-priority computing device; and
reducing the power consumption of the lower-priority computing device more than the power consumption of the higher-priority computing device is reduced.

17. The non-transitory computer readable medium of claim 15, wherein:
the computer readable program code that, when executed, causes the at least one processing device to classify each power constraint violation comprises computer readable program code that, when executed, causes the at least one processing device to classify each power constraint violation starting at a top level of the hierarchy and moving downward in the hierarchy; and
the computer readable program code that, when executed, causes the at least one processing device to resolve the one or more power constraint violations comprises computer readable program code that, when executed, causes the at least one processing device to resolve the one or more power constraint violations starting at a bottom level of the hierarchy and moving upward in the hierarchy.

18. The non-transitory computer readable medium of claim 15, wherein:
the information identifies multiple power constraint violations associated with at least two of the levels of the hierarchy; and
the computer readable program code that, when executed, causes the at least one processing device to resolve the one or more power constraint violations comprises computer readable program code that, when executed, causes the at least one processing device to resolve a lower-level power constraint violation in a manner that at least partially resolves a higher-level power constraint violation.

19. The non-transitory computer readable medium of claim 18, wherein the computer readable program code that, when executed, causes the at least one processing device to resolve the one or more power constraint violations comprises:
computer readable program code that, when executed and in response to the lower-level power constraint violation only partially resolving the higher-level power constraint violation, causes the at least one processing device to resolve the higher-level power constraint violation by throttling power consumption of at least one lower-level computing device that did not experience a power constraint violation.

20. The non-transitory computer readable medium of claim 15, wherein:
a specified power constraint violation is associated with a specified collection that includes multiple computing devices; and
the computer readable program code that, when executed, causes the at least one processing device to classify each power constraint violation comprises computer readable program code that, when executed, causes the at least one processing device to identify, for the specified power constraint violation, all of the multiple computing devices in the specified collection.

* * * * *